United States Patent
Whitmyer, Jr.

(10) Patent No.: US 9,319,370 B2
(45) Date of Patent: Apr. 19, 2016

(54) CONFIGURABLE WEBSITE AND SYSTEM WITH ACCESS CONTROL AND SOCIAL NETWORK FEATURES

(75) Inventor: Wesley W. Whitmyer, Jr., Stamford, CT (US)

(73) Assignee: WHORLR LLC, Stamford, CT (US)

( * ) Notice: Subject to any disclaimer, the term of this patent is extended or adjusted under 35 U.S.C. 154(b) by 247 days.

(21) Appl. No.: 13/315,079

(22) Filed: Dec. 8, 2011

(65) Prior Publication Data

US 2012/0079568 A1    Mar. 29, 2012

Related U.S. Application Data

(60) Provisional application No. 61/534,201, filed on Sep. 13, 2011.

(51) Int. Cl.
| | |
|---|---|
| *G06F 21/00* | (2013.01) |
| *H04L 12/58* | (2006.01) |
| *G06F 17/30* | (2006.01) |
| *G06F 21/62* | (2013.01) |

(52) U.S. Cl.
CPC ............ *H04L 51/28* (2013.01); *G06F 17/3089* (2013.01); *G06F 21/6218* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 7,783,980 | B1* | 8/2010 | Herold ......................... | 715/740 |
| 7,788,495 | B2* | 8/2010 | Anthe et al. .................. | 713/175 |
| 8,468,577 | B1* | 6/2013 | Pooley et al. .................... | 726/1 |
| 8,832,151 | B2* | 9/2014 | Saha et al. .................... | 707/784 |
| 2002/0124188 | A1* | 9/2002 | Sherman et al. .............. | 713/201 |
| 2005/0021611 | A1* | 1/2005 | Knapp et al. .................. | 709/203 |
| 2006/0229900 | A1* | 10/2006 | Paul et al. ........................ | 705/1 |
| 2007/0136657 | A1* | 6/2007 | Blumenthal et al. .......... | 715/512 |
| 2009/0198668 | A1* | 8/2009 | Jean Bolf et al. ................ | 707/5 |
| 2010/0063963 | A1* | 3/2010 | Whitmyer, Jr. ................ | 707/640 |
| 2010/0235494 | A1* | 9/2010 | Sood et al. .................... | 709/224 |
| 2012/0011067 | A1* | 1/2012 | Katzin et al. .................... | 705/44 |
| 2012/0084841 | A1* | 4/2012 | Whitmyer, Jr. .................... | 726/4 |
| 2012/0158521 | A1* | 6/2012 | McCullen .................. | 705/14.69 |
| 2012/0272136 | A1* | 10/2012 | Takami ......................... | 715/234 |
| 2013/0021368 | A1* | 1/2013 | Lee et al. ....................... | 345/619 |

* cited by examiner

*Primary Examiner* — Michael R Vaughan
(74) *Attorney, Agent, or Firm* — Whitmyer IP Group LLC

(57) ABSTRACT

A web-based system allows for publishing a website with features and access configured on a user-by-user basis by the website owner to present personal data as well as social network feeds in a single interface. The website owner can update and manage his/her social media from the same page, as well as organize private data if desired. The system includes a messaging function, in accordance with which users can drop a message into the message service of a site owner, and it gets delivered to the site owner in exactly the manner specified by the site owner.

75 Claims, 6 Drawing Sheets

CONFIGURABLE WEBSITE AND SYSTEM WITH ACCESS CONTROL AND SOCIAL NETWORK FEATURES

CROSS-REFERENCE TO RELATED APPLICATIONS

The present application claims the benefit of, pursuant to 35 U.S.C. 119(e), U.S. Provisional Patent Application No. 61/534,201, filed on Sep. 13, 2011, the content of which is incorporated herein by reference.

FIELD OF THE INVENTION

This application relates to configurable websites, and more particularly to configurable access control of web pages.

BACKGROUND OF THE INVENTION

Configurable web pages are well known. Many web portals, such as Google® and Yahoo® for example, offer users the ability to customize a start or home page in addition to offering search engine capability. In the case of Google®, users can select and arrange so-called "gadgets" which add certain features to their pages. Each page is personal to the user, however, and cannot be accessed by anyone else.

Also known are online tools that are often hosted by domain registrars for generating websites. Typically these tools use templates and themes to generate boilerplate HTML by plugging user data and text into the template. Other tools such as Google® Sites are a bit more sophisticated and offer user selected functions, for example Google® "gadgets," that can be plugged into template layouts to generate web pages. Google® Sites also permit user control at the site and page level such that pages can be published, or available only with the direct link, or private and require login to a permitted Google® account. There is no way to control access on a functional basis, for example to control access for each added "gadget". Disadvantageously, therefore, a Google® Site can not include multiple gadgets on the same page with different access control limits to each "gadget".

Social networking sites such as Facebook®, Twitter® and the like are also known and provide some ability to configure web served content. However access is only controllable on the site, not the functional, level and as with Google® Sites, access requires permitted users to login to a closed network. One has to have a Facebook® account to see a nonpublic Facebook® page and a Google® account to see a protected Google® site.

The social networking sites are generally organized as isolated silos on the Internet. For example, Facebook® does not want to make it easy for users to use Twitter®. Most social networking sites do provide APIs permitting users to mine their own data, and these APIs are used by social media aggregation sites such as Hootsuite® to present users their own data from different sites. The aggregators typically combine multiple streams of data into columns on a single screen presenting a dashboard view of a user's own information. These aggregation sites are not designed or intended to present users' data to third parties.

One service that is intended to present information to third parties about how to access a user's social media is About.me™. Users set up a page that includes links to their various social media sites, but there is no way to control access to individual accounts on a user-by-user basis and there also is no way for the users to manage their own social media accounts from the same page, much less post updates or additional information about themselves.

Blogging sites, such as Tumblr and the like, are also known. These sites allow users to set up their own pages for publication of a variety of types of data, e.g., images, text, links etc., but there is no way to control access to each of type of data on a single site. Blogging sites are typically public, but some offer the ability host private blogs as well; however, access is controlled on the site level only and most of the content is locally hosted.

There is no simple way to collect data feeds from a variety of social networking sites and combine it with other user data for presentation on a single webpage with access control limited by individual function on the page as opposed to all functions on the page or site.

What is desired, therefore, is web-based system for publishing a website with features and access configured on a user-by-user basis by the website owner to present personal data as well as social network feeds in a single interface. It is also desired that the website owner can update and manage his social media from the same page, as well as organize private data if desired.

SUMMARY OF THE INVENTION

Accordingly, it is an object of the invention to provide a webpage through which users can access the webpage owner's social media and other data.

Another object of the invention is to provide a system that controls access to the functionality of third party websites by user and function, and where different users can access different functions or sets of functions depending on the access they have been granted.

Another object of the invention is to provide a webpage containing an owner's social media data and functionality that is accessible by other users without the users needing to have access to a closed silo social network.

Another object of the invention is to provide a system that selectively presents access to data from the owner's individual social media accounts on a user-by-user basis.

Another object of the invention is to provide a system that allows the owner to manage his various social media accounts from the same page Another object of the invention is to provide a system that collects data feeds from a variety of social networking sites, combines it with owner data, and presents the data to the web, where aspects of the presentation is by function.

These and other objects of the present invention are achieved by provision of a configurable website system that helps to organize Internet users and their data on the Internet. Many Internet users have multiple email accounts, own multiple cell phones, use one or more social media networks, and have uploaded photos/videos to several different sites, posted to a blog or two, added their profiles/resumes on a job site, written papers or other content published somewhere on the web, etc. Their digital fingerprints are scattered all over the Internet. Even the 'secure' footprints require one to remember a long list of website addresses, user names and and/or not so secure passwords. Many Internet users have a tattered and out of date cheat sheet of user names and passwords. When they need it at work, it's at home. When they need it in the airport, it's at work. Putting their data in the cloud is convenient but only if they can find their paper list of usernames and passwords.

To make matters worse, many Internet users have accounts to many sites on which they haven't ever posted data. This is true because they need an account to a private site or network to see the photos of their best friend's wedding, to read the rest of that interesting newspaper article, to add their name to the signup sheet for their club picnic. The web has enriched our lives in many ways and helped us manage data, but it enslaves us anew to a veritable kudzu of usernames and passwords. Further complicating things are the sites that require 8 character passwords with at least one number and one special character.

It's not widely understood, but one of the reasons Facebook is useful to people is because it helps them manage the username password kudzu. Once they are logged into Facebook, users can post different kinds of data in one place and easily find similar data posted by their friends. With a single username and password they can access a private network on which they can leave their own virtual footprints and follow the virtual footprints of others. As long as enough of one's friends are leaving footprints on the same private network, Facebook is a way to cut away some of the kudzu and organize some of an Internet user's virtual footprints. As large and ubiquitous as Facebook has become, however, it is still only a small slice of the Internet and only includes a small amount of an Internet user's virtual footprints. Facebook only organizes users' Facebook data and Facebook takes ownership and control of that data away from the users in the process. Facebook owns and profits from their virtual footprints.

The system of the present invention empowers Internet users with very simple tools to control all of their virtual footprints, including not only the ones they have added to Facebook and other private networks but also those virtual footprints they have left elsewhere on the open Internet. Users create and own their own site by pointing out their virtual footprints on the Internet and specifying who (the public, one or more private friends or lists, or only they alone) should have access to each set of footprints, together with what level of access rights each user or list should have, e.g., view, edit (add and/or delete), own, and the like. Each user only gets access to those of the owner's footprints that are relevant to the user. As owner of a site, one can add and edit her footprints or change the list of friends with access to any of them at any time. One can post to his Facebook page, send an email, upload a photo all from within his site or directly to the third party account used to create this trail of one's virtual footprints to start with. Either way, the content, one's latest footprints, are available instantly on the owner's site, accessible only by the friends the owner wants to have access.

Each site on the system of the present invention is a website page that is unique to its owner. A site is its owner's virtual fingerprint and defines its owner in the virtual world of the Internet in the same way the whorl on one's finger is her real fingerprint and defines her in the physical world. Setting up a site is as easy as pointing to all of the owner's trails of virtual fingerprints on the Internet. It is the trailhead of the owner's life on the web. After identifying all of one's footprint trails, the owner decide who gets a map and how many trails each map includes. In other words, the owner decides which users get to follow each trail of his virtual footprints. After all, they are the owner's virtual footprints, and the owner should get to choose how many of them to share, and who to share them with. The owner may add as many virtual footprint trails as she wishes to her site, and make as many maps as she wishes to permit any number of different users or groups access to different trails. An owner of a site can add trails, delete trails, add or delete footprints, delete maps and users and groups, make new maps, add new users and groups, even keep private trails accessible only to himself. One owns and controls access to all of his data on the Internet, and has all of his virtual footprints organized in one place; his site on the configurable website system of the present invention. All of an owner's digital data in one place, plus access to all her friends' data, and only a single password to remember.

Users of an owner's site also benefit because they can access all of the owner's virtual footprints in one place. Using a messaging service, they can also always reach the owner, exactly in the way the owner wants. Users authorized by the owner drop a message into the message service of a site owner, and it gets delivered to the site owner in exactly the manner specified by the site owner. The site owner can organize incoming messages by time, calendar, user, viewing method, etc. The site owner can receive messages in the way she wants, but all her friends need to know is one address, the owner's site address.

With the system of the present invention, each owner is provided with a messaging service inbox that the owner can chose to associate with his personal site. The messaging service has some unique characteristics that put the owner in control of her incoming electronic messages and preserve her privacy in the process. The messaging service inbox of the present invention differs from other electronic messaging systems in several important ways. First, recipients have no address so there is nothing to be harvested or spammed and the owner is free to change his electronic inboxes at any time without any disruption in message delivery or burden on senders to update their address books. Second, only senders authorized by the owner have access to the owner's messaging service inbox. This means messages from any particular person can be permanently blocked by the recipient/owner at any time.

By employing the system of the present invention, users do not need to remember which cell phone number the site owner is currently using, which email address is still valid, where to find those photos from the site owner's last outing, or how to subscribe to the site owner's Twitter feed. Everything is right in one place and users have access to it all on an owner's site. Once users navigate to an owner's site, they have instant access to an updated map of the owner's virtual footprints on the web—the map the owner customized for them—and the data the owner wants to share are only a click away. As an owner's digital footprints grow, new trails are automatically added to his friends' maps.

Owners' sites are preferably programmed as web pages and therefore accessible on any kind of hardware device. The pages themselves preferably minimize the use of text menus to facilitate access on tablet computers and other touch screen devices, such as smartphones. Instead of traditional text menus, the pages may use easy to see and manipulate graphical methods of selection, such as buttons. Available options may be displayed as graphical scrolls instead of dropdowns or other text-based lists. Non-selected options may similarly be displayed as a scroll to facilitate navigation and reduce page reloads. The GUI is preferably intuitive and easy to use on any kind of browser with a finger or other pointing device for browsing and selection. However, in certain embodiments, hardware specific apps may be used to recreate the same user experience available in the web-based sites.

DETAILED DESCRIPTION OF THE INVENTION

Figure 1:
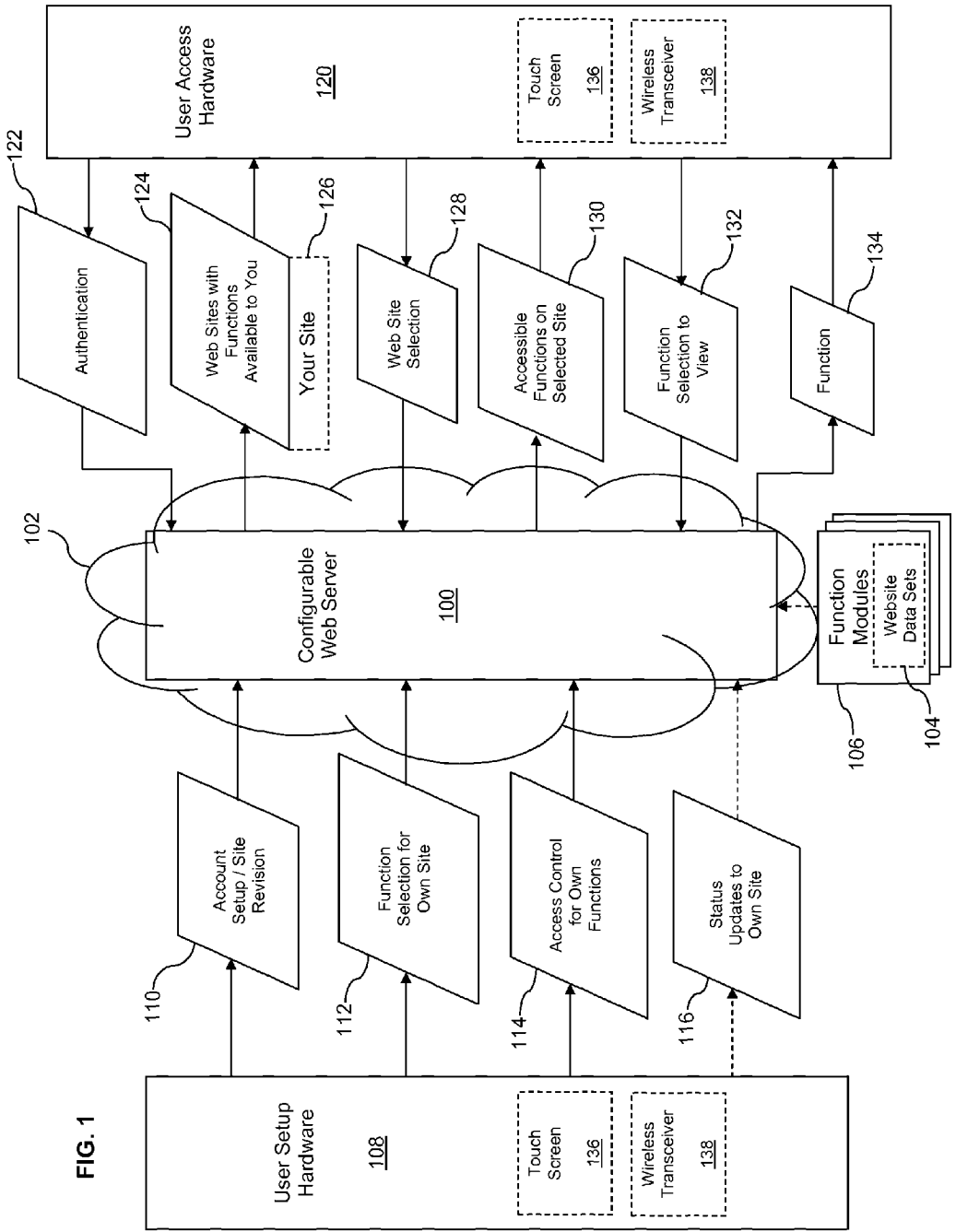
FIG. 1 is a block diagram illustrating a configurable web server system according to the invention.

FIG. 1 depicts structures and operations pertaining to a configurable website and system with access control and social network features in accordance with the invention.

A configurable website according to the invention enables an owner to provide a user with access to the functionality of other websites. The authority to access this functionality is supplied on a per-function basis. For example, a user can be granted the use of certain functions of a particular website, but not to others, such as being granted the ability to read content on the website, but not to modify it. Or the ability to modify text on the website, but not images. Furthermore, the user can be granted different degrees of authority over the functionality of several websites. For instance, the user could be granted access only to read content on website A, but be granted access to modify as well as read content on website B, and so forth. Optionally, many users can access the configurable website, each being granted specific authority to access functionality on other websites. Furthermore, the configurable website itself can include functions and content to which specific access can be granted to users in the same way. These functions may be individual to the configuration webpage, or may be an aggregate of the functionality and content of the other webpages. These examples are not intended to be limiting, and it will be clear to those having skill in the art that many combinations of functionality authorizations are possible without departing from the spirit of the invention.

To this effect, a configurable web server 100 is provided connected to a network 102. Web server 100 has access to various function modules 106 over network 102, at least one of which function modules may include website data sets 104.

Figure 1A:
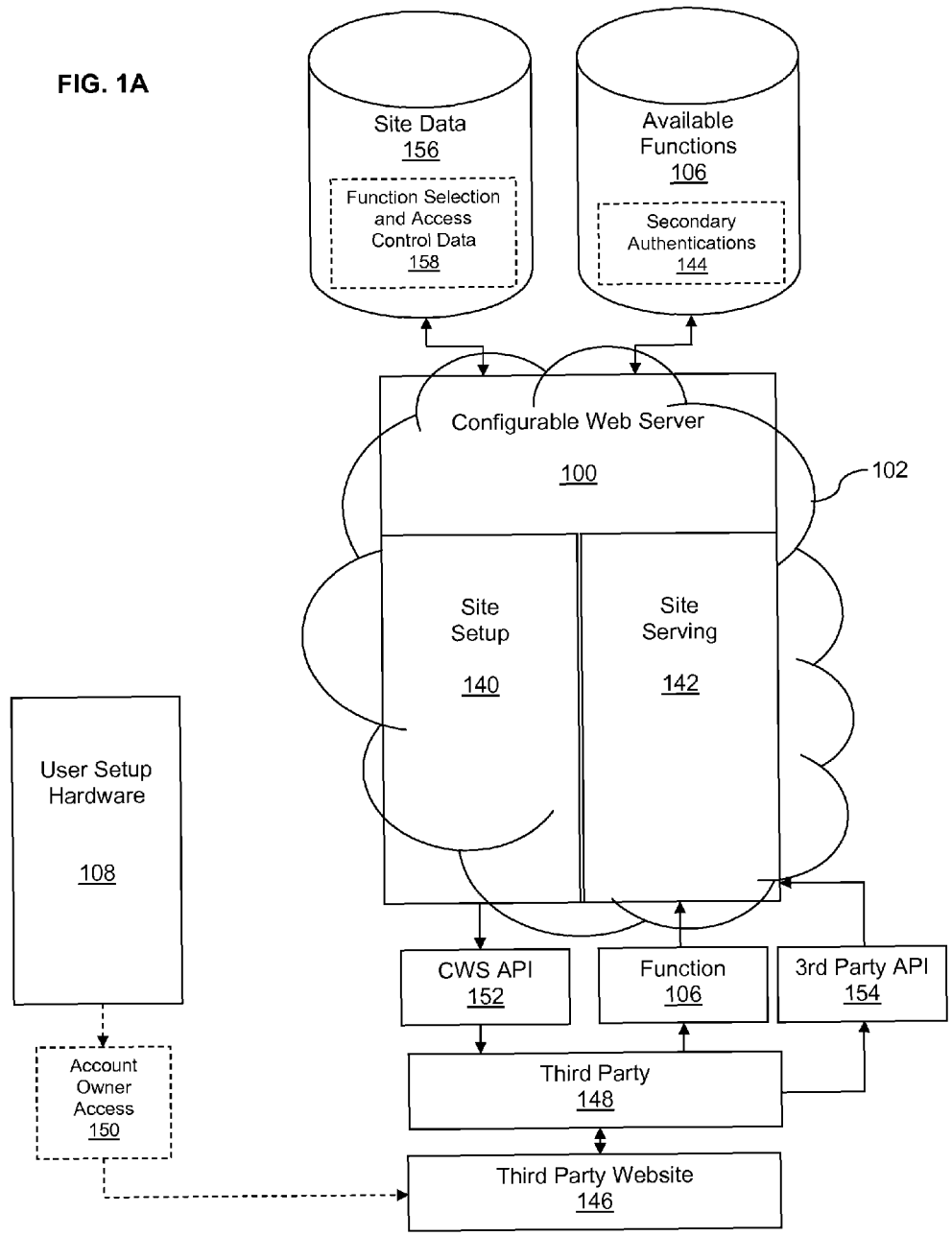
FIG. 1A is a block diagram illustrating in more detail a portion of the configurable web server system of FIG. 1.

The configurable web server 100 may be a traditional web server or any other hardware and/or software for serving a website to visitors, with a more detailed view of a preferred embodiment of the web server 100 being shown in FIG. 1A. The network 102 may be the internet, a subset of the internet, a local area network, wide area network, wireless network, cloud, or other arrangement for computer communications. Website data sets 104 can relate to any type of website, including social networking websites that provide a homepage, blog, comment posting, syndication, or other such functionality to the owner, and may require authentication for access to all or part of their content. Website data sets 104 may relate to websites requiring authentication for use on a per-function basis however, in which case, website data sets 104 may include data relating to a secondary authentication to an Internet computing resource.

Web server 100 can be used to generate a configurable website (not shown) for use as an interface, whereby an owner can aggregate content from website data sets 104, and can control access to websites on a per-user and per-function basis. In this regard, web server 100 can be viewed as having a site setup portion 140 and a site serving portion 142.

Function modules 106 can be accessed by the owner for incorporation into the configurable website, and can include various basic functionality for running a website, including applets, scripts, templates, style sheets, and the like. Function modules 106 may be provided on the web server 100, or be provisionable from third parties 148 that hosting third party websites 146 that may be made available to the system 100 over network 102. The third party websites 146 may also be directly accessed by the webpage owners using user setup hardware 108 in the usual way of employing account owner access 150.

Example function modules 106 can include website data sets 104 which may include a secondary authentication 144 to a computing resource, such as a third party website 146, such as a web server hosting a social media site (not shown). Further example function modules 106 can include an application programming interface ("API"), which may be used to retrieve and display data, change data, or supplement data. The API can be a configurable web server API 152 provided to a third party 148 for modification, or can be entirely created by the third party 148, before being uploaded to the web server 100 as a third party API 154. Function modules 106 may be generated by a third party (as shown in FIG. 1A) and may provide access on the configurable website to third party data. As another example, function modules may simply comprise data itself. For example, individual pieces of art and blog posts may be tagged with permissions instead of subjects when they are uploaded. In this manner, new art only shows up in the appropriate collection(s) and blog posts are only viewable by the intended user/group.

User setup hardware 108 is also connected to network 102 and is accessible to the owner. Using the user setup hardware 108, the owner can transmit account setup or site revision data 110, a selection of functions 112 to be enabled on the configurable website, access control 114 for functions enabled on the configurable website, and optionally, status updates 116, to system 100.

User setup hardware 108 can be a computer, laptop, mobile device, smartphone, or other device for accessing a web server. Account setup or site revision data 110 may include information for running the configurable website, including owner personal information, passwords and multifactor authentications to access the configurable website, correspondence information such as e-mail addresses, information pertaining to the desired display of the configurable website, and URLs for the various websites that can be managed using the system 100.

Account setup data 110 may include authentications which serve as access credentials for other website data sets 104 in addition to the configurable website. Access credentials can include passwords, multifactors, tokens, or other ways of controlling access to each website. Optionally, a permitted user list (not shown) is associated with the configurable website, website data sets 104, and/or function modules 106.

Optionally, website date sets 104 relate to social networking websites (not shown). Social networking websites may include but are not limited to websites for creating and connecting public, private, and semi-public user profiles, online communities, blogs, news feeds, audio and video sharing, and web syndication websites. Such websites are frequently closed-silo communities where only third party users having an account on that particular website would be able to view or interact with content belonging to an owner of a profile. The present invention provides the advantage of supplying access to an owner's information that is stored in such closed-silo communities, without requiring third party users to first obtain an account of their own.

Functions 112 can include a selection of functions 106 enabled for the configurable website. For instance, the owner can choose to enable content posting on the configurable website itself. Access control 114 is also specified for the functions enabled on the configurable website, i.e., who can access each function. Optionally, status updates 116 to the configurable website can be transmitted to system 100 from the user setup hardware 108 if this functionality has been selected. This various site data 156, including the function selection and access control date 158, specified by the owner may be stored in a a database or other memory accessible to the web server 100.

To access the configurable website (not shown), user access hardware 120 is accessible to either the owner or to third party users of the configurable website and is connected to network 102. User access hardware 120 can be a computer, laptop, mobile device, smartphone, or other device for accessing a webpage, and optionally, can be the same hardware used as the user setup hardware 108. The user first transmits an authentication 122 from the user access hardware 120 to the system 100. Authentication 122 may be a password, multi-factor authorization, hardware token, or other way of controlling access to the configurable website. System 100 responds by transmitting accessible website data 124, regarding websites with functions that are accessible to that user. If the user is the owner or another user with proper authorization, accessible website data 124 can also include data regarding the configurable website itself. Subsequently, the user can select a website from amongst the accessible website data 124, and transmit website selection 128 from user access hardware 120 to system 100. System 100 then responds by transmitting accessible function data 130 to user regarding functions that are accessible to that user for the selected accessible website. The user can then select a function, and transmit function selection 132 from user access hardware 120 to system 100.

User setup hardware 108 and/or user access hardware 120 may optionally include a touch screen 136 to facilitate user input, and/or may optionally include a wireless transceiver 138 to enable wireless communication.

Accessible website data 124, accessible function data 130, and selected function 134 will typically be transmitted to the user access hardware 120 from system 100 as a webpage, for display to the user on a GUI (not shown), as further discussed below. The GUI may be a combination of a display and driver software. Optionally, the accessible website data 124 and accessible function data 130 are presented to the user as thumbnail images (not shown) within a webpage. Thumbnail images may be a miniaturized image of the webpage or function they represent, or may be a different image.

Figure 2:
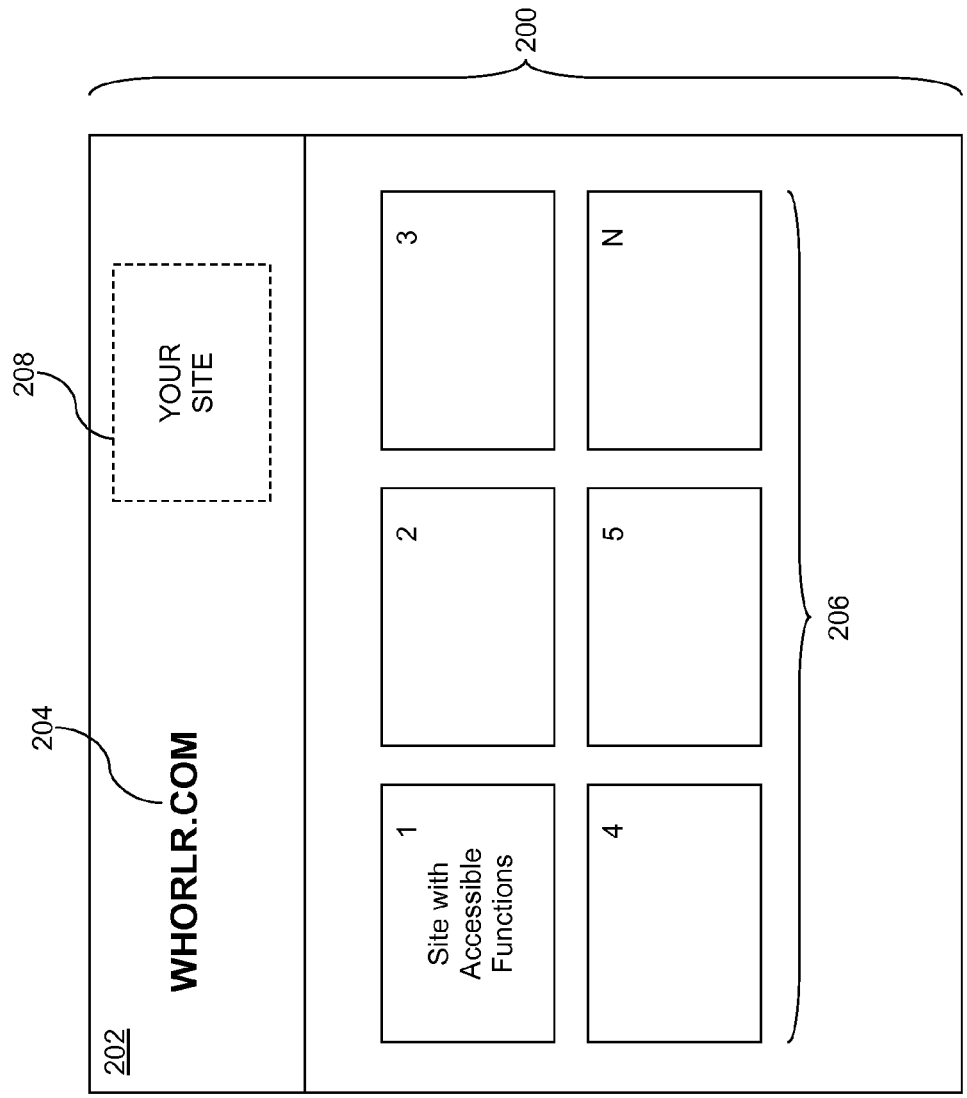
FIG. 2 is an illustration of an example web page served by the configurable web server system of FIG. 1.

FIG. 2 illustrates an example display 200. Display 200 is an example of a page of the configurable website, which displays a selection of websites to which the user has been granted access via the configurable website. These websites may be represented by thumbnail images 206. Display 200 may have a title bar 202 which displays a title 204. If the user is the owner, or has been granted an appropriate level of authority, a thumbnail 208 representing the configurable website itself may also be displayed.

Optionally, display 200 is displayed on user access hardware 120 and reflects accessible website data 124 transmitted from system 100, as shown and described with respect to FIG. 1. In some embodiments, the user can choose a thumbnail 206, 208 using a mouse cursor or other suitable selection means (not shown). A website selection 128 reflecting this choice is then transmitted as shown and described with respect to FIG. 1.

Figure 3:
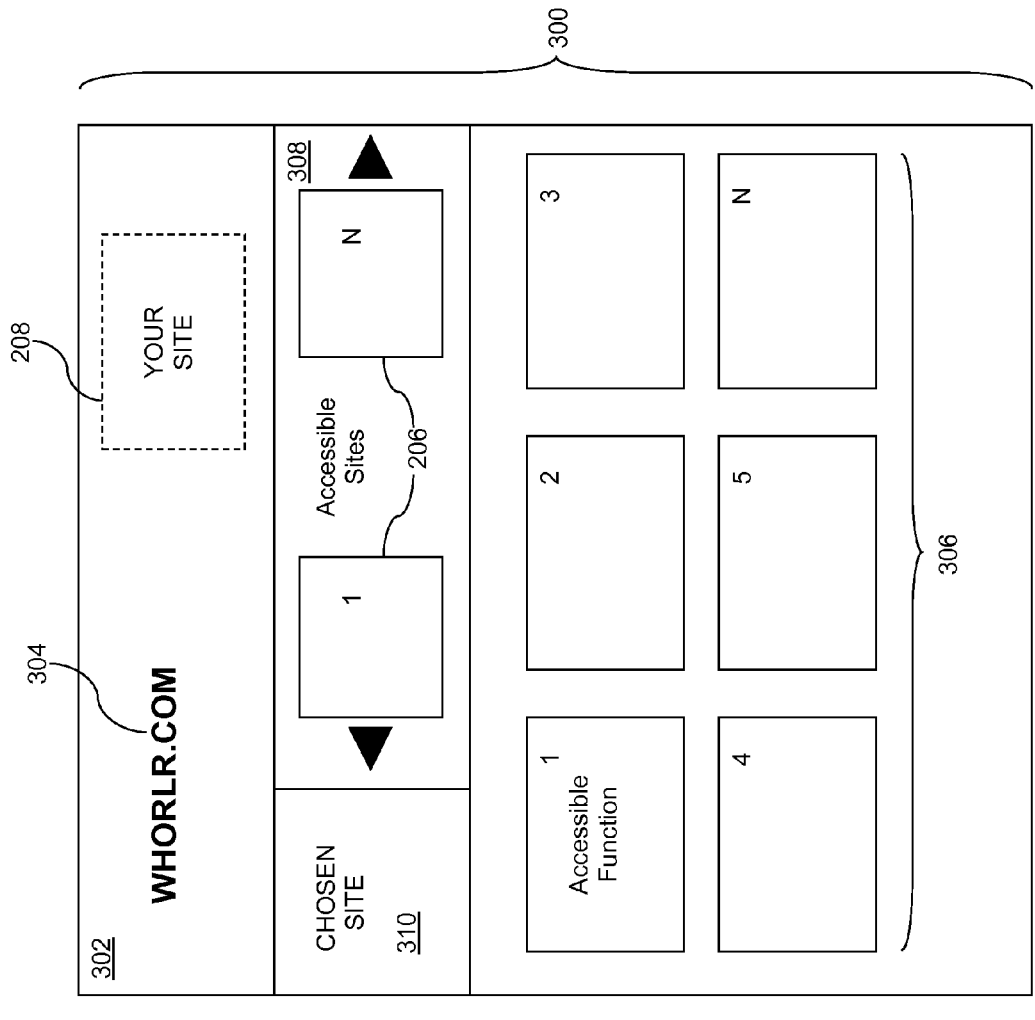
FIG. 3 is an illustration of an example web page served by the configurable web server system of FIG. 1.

FIG. 3 illustrates an example display 300. Display 300 may have a title bar 302 which displays a title 304. Display 300 displays thumbnail images 306 representing various website functions to which the user has been granted access by the owner of the configurable website, pertaining to a website chosen from display 200 (FIG. 2). A website selection bar 308 displays thumbnail images 206 as described with respect to FIG. 2. If the user is the owner, or has been granted an appropriate level of authority, a thumbnail 208 representing the configurable website itself may be displayed in website selection bar 308, or in title bar 302. A chosen website indicator 310 displays a thumbnail image of the currently chosen website, whose accessible functions are shown by thumbnail images 306.

Optionally, display 300 is displayed on user access hardware 120 and reflects accessible function data 130 transmitted from system 100, as shown and described with respect to FIG. 1. In some embodiments, the user can choose a thumbnail image 306 using a mouse cursor or other suitable selection means (not shown). A function selection 132 reflecting this choice is then transmitted as shown and described with respect to FIG. 1. Optionally, the user can also choose a thumbnail 308, 208 to view accessible functions for a different website (not shown). A website selection 128 reflecting this choice is transmitted as shown and described with respect to FIG. 1.

Figure 4:
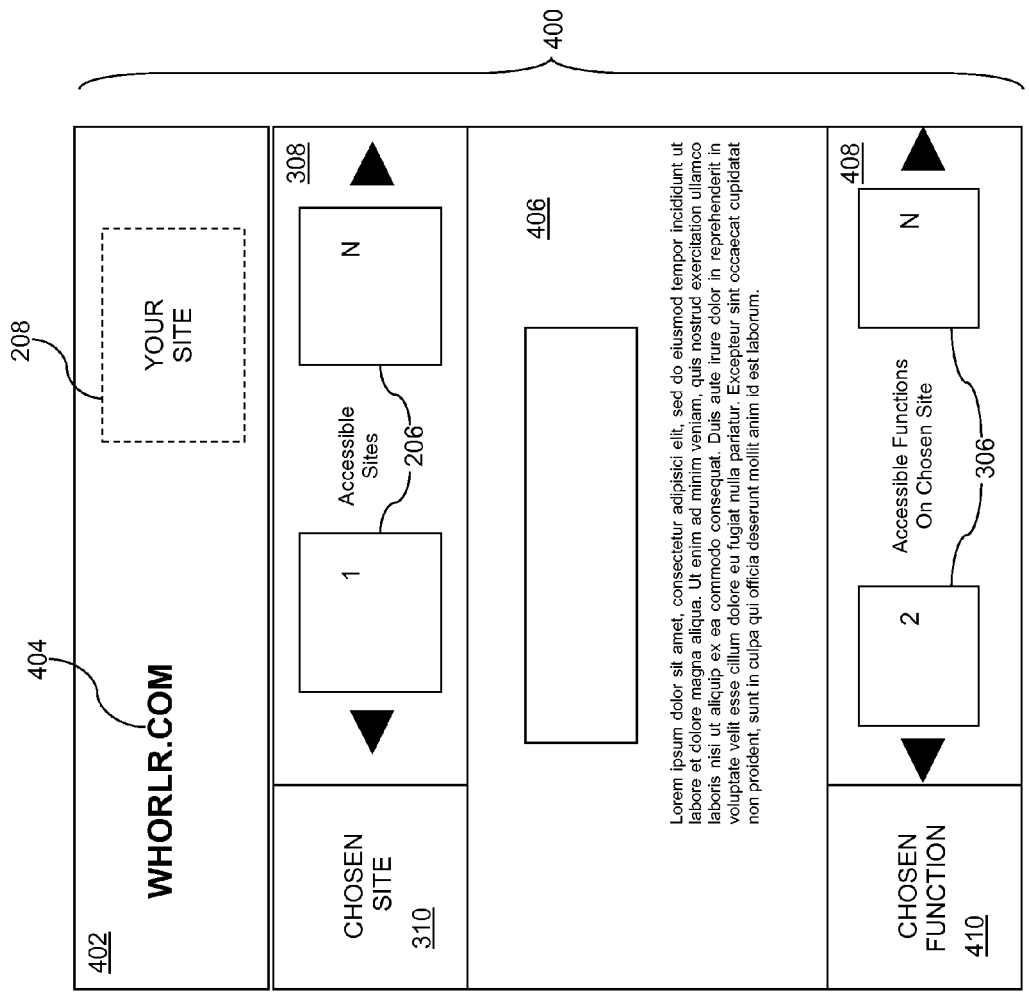
FIG. 4 is an illustration of an example web page served by the configurable web server system of FIG. 1.

FIG. 4 illustrates a display 400 according to an embodiment of the invention. Display 400 may have a title bar 402 which displays a title 404. Display 400 displays and provides access to a function 406 to which the user has been granted access by the owner of the configurable website. The function 406 may have been chosen from display 300 (FIG. 3). The user may interact with function 406 via display 400. For example, the user may edit text data if function 406 provides this capability.

Function selection bar 408 displays thumbnail images 306 as described with respect to FIG. 3. Chosen function indicator 410 displays a thumbnail image of the currently chosen function 406. Website selection bar 308 displays thumbnail images 206 as described with respect to FIG. 2. If the user is the owner, or has been granted an appropriate level of authority, a thumbnail 208 representing the configurable website itself may be displayed in website selection bar 308, or in title bar 402. Chosen website indicator 310 displays a thumbnail image of the website whose accessible functions are shown by thumbnail images 306.

Thumbnail images 306 representing various website functions to which the user has been granted access by the owner of the configurable website, pertaining to a website chosen from display 200 (FIG. 2).

Display 400 can be displayed on user access hardware 120 and reflects accessible function data 130 transmitted from system 100, as shown and described with respect to FIG. 1. In some embodiments, the user can choose a thumbnail image 306 using a mouse cursor or other suitable selection means (not shown). A function selection 132 reflecting this choice is then transmitted as shown and described with respect to FIG. 1.

The user may also choose a thumbnail 308, 208 to view accessible functions for a different website (not shown) or chose a thumbnail 408 to access a different function A website selection 128 reflecting this choice is transmitted as shown and described with respect to FIG. 1.

Figure 5:
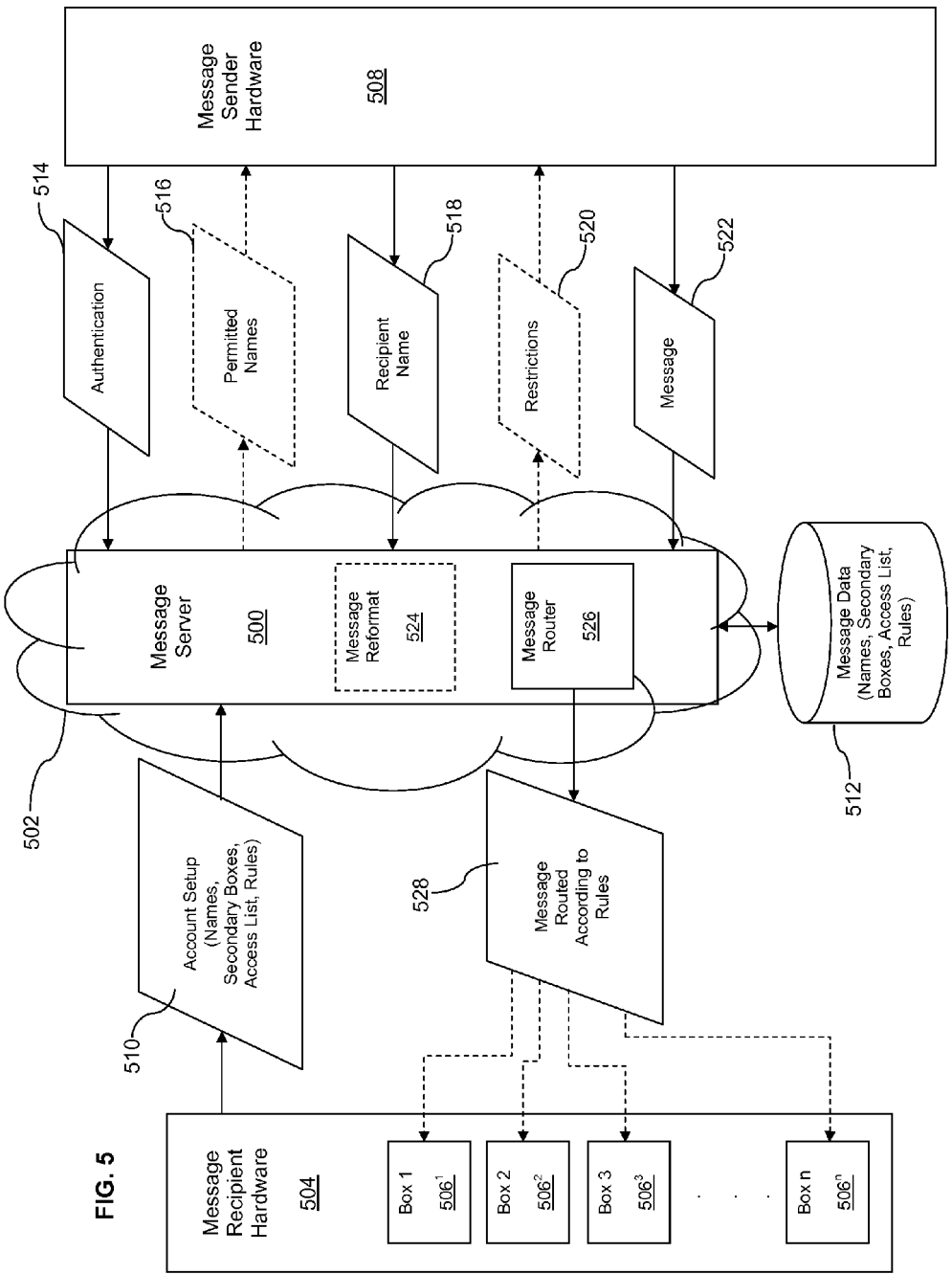
FIG. 5 is a block diagram illustrating messaging system in accordance with the present invention, which may be used in conjunction with the configurable web server system of FIG. 1 or independently thereof.

FIG. 5 depicts structures and operations pertaining to a messaging system in accordance with another aspect of the present invention, which may be used in conjunction with the configurable web server system of FIG. 1 or independently thereof.

The system includes a message server 500 connected to a network 502. Message server 500 may be a traditional mail server, web server or any other hardware and/or software for serving messages. The network 502 may be the Internet, a subset of the Internet, a local area network, wide area network, wireless network, cloud, or other arrangement for computer communications.

Message recipient hardware 504 is also connected to network 502 and is in communication with the message server 500. Message recipient hardware 504 can be a computer, laptop, mobile device, smartphone, or other device for communicating with a message server, and can be the same hardware as user setup hardware 108 described above when the messaging system is used in conjunction with the configurable website system described above, or can be separate therefrom. Message recipient hardware 504 is also be used to access one or more recipient electronic mailboxes $506^1$-$506^n$, each of which may be configured in any known or yet to be developed messaging format.

Message sender hardware 508 is also connected to network 502 and is in communication with the message server 500. Message sender hardware 508 can be a computer, laptop, mobile device, smartphone, or other device for communicating with a message server, and can be the same hardware as user access hardware 120 described above when the messaging system is used in conjunction with the configurable website system described above, or can be separate therefrom. Message sender hardware 508 is preferably configured to be able to read and manipulate web pages, as described in more detail below.

Initially, the message recipient uses message recipient hardware 504 to configure his messaging account by supplying account setup message data 510 to message server 500. This message data may include a name or names associated with the message recipient, a list of one or more secondary electronic mailboxes to which the message recipient has access, an access list of senders authorized to send messages to the message recipient, and messaging routing rules. The message routing rules may be dependent, for example, upon parameters such as message sender (e.g., all messages from Sender A should be routed to Box 2), time of day (e.g., all messages received after 5:00 pm should be routed to Boxes 1 and 3), days of the week (e.g., all messages received on Saturdays should be routed to Box 3), particular dates (e.g., all messages received from Jan. 1, 2011-Jan. 8, 2011 should be routed to Boxes 1 and 2), etc. The rules may also comprise a matrix dependent upon two or more parameters (e.g., all messages received from Sender B after 10:00 pm should be routed to Box 2). Upon receipt of account setup message data 510, or changes thereto, by message server 500, message server may store the message data in a database 512 or other memory. Furthermore, the rules may specify one or more particular formats in which the recipient desires to receive messages for each of her electronic mailboxes.

When a message sender desires to send a message to a message recipient using the system of the present invention, the message sender may use message sender hardware 508 to supply an authentication 514 to message server 500. In response, the message server 500 may, based upon the authentication 514 and the message data stored in database 512, transmit to message sender hardware 508 a list of permitted names 516 to whom the message sender is authorized to send messages. The message sender may then select a recipient name from the list and transmit the selected recipient name 518 to the message server 500.

Alternately, the transmission of the list of permitted names 516 may be omitted, and the message sender hardware 508 may be used to transmit both the authentication 514 and the recipient name 518 without the list of permitted 516 names being provided. In this case, the message server 500 may analyze the authentication 514 and the recipient name 518 against the message data stored in database 512 in order to determine whether the message sender is authorized to send messages to the identified message recipient.

This may be the case, for example, when each message recipient has his own personal web page, similar to that described above in connection with the configurable website system shown in FIG. 1, such that the message sender may simply choose a "send message" function from the recipient's web page (it being the case that if the "send message" function is available for selection, the would-be message sender would have been authorized to send messages).

In any event, is it preferred that the message is received from the message sender via a non-public electronic mailbox address. More specifically, it is highly desirable that the manner in which the message is received from the message sender be strictly limited only to authorized message senders, and that the addresses for the secondary electronic mailboxes to which the message recipient has access, be kept private so as to prevent spammers from being able to obtain access to the electronic mailboxes of the message recipient.

Once the recipient name has been received, the message server may optionally transmit to message sender hardware 508 a description of any restrictions 520 placed on the message sender by the message recipient, as contained in the message data stored in database 512. The message sender hardware may then be used to create and transmit a message 522 to the message server 500. In one embodiment, the message server 500 may serve a web page to message sender hardware 508 with message creation and transmission functionality, thereby allowing messages to be send by any message sender hardware 508 capable of viewing and manipulating web pages.

Once the message 522 is received by the message server 500, the message server 500 examines the parameters surrounding receipt of the message 522 in view of the message data stored in database 512. Message reformat software 524 may optionally be provided for translating the message 522 into a desired format specified in the message data stored in database 512, if necessary. Message router software 526 then determines, based upon the parameters surrounding receipt of the message 522, the message data stored in database 512 (particularly, the rules and secondary mailbox information) and any necessary extrinsic information, such as time, date, etc. to which electronic mailbox or mailboxes the message should be routed, before routing the message 528 to the appropriate electronic mailbox or mailboxes.

By employing the messaging system described above, message addresses are kept private, but incoming messages are still allowed to be routed to one of several electronic inboxes as desired by the recipient/owner. Also provided is the ability to route incoming messages to a private address to an electronic box of a different messaging format, and the ability to limit incoming messages to an approved sender list. The ability to route the messages according to a matrix of parameters such as sender, time, date, etc. is also provided.

Although the invention has been described with reference to a particular arrangement of parts, features and the like, these are not intended to exhaust all possible arrangements or features, and many modifications and variations will be ascertainable to those of skill in the art.

What is claimed is:

1. A configurable website system comprising:
   a web server available over a network, said web server having a server processor;
   a plurality of function modules in data communication with said web server, said plurality of function modules including a plurality of third party social media data feeds associated with a plurality of third party social media accounts of a content owner;

a permitted user list associated with each of said plurality of function modules, stored in a database in communication with said web server, said permitted user list identifying a plurality of individual users permitted by the content owner to access the function modules, the content owner being an individual person who delegates and stores permissions for each of the users in said permitted user list on a user-by-user basis independent of any site level access control of the plurality of third party social media accounts; and software executing on the server processor for receiving a user authentication from access hardware over the network and matching the authentication to said permitted user list for assembling a website from at least two of said plurality of function modules including at least two of the plurality of third party social media data feeds associated with at least two of the plurality of third party social media accounts of the content owner to which the received user authentication is permitted access for display on the access hardware, whereby content of the website displayed on the access hardware is customized to the user authentication and depends on the function module access permitted by the content owner to the authenticated user on a user-by-user basis.

2. The configurable website system of claim 1 wherein the user authentication permits access to multiple function modules for assembly into a version of the website displaying the multiple function modules.

3. The configurable website system of claim 1 further comprising software executing on said server processor for receiving function selection and access control data from setup hardware over the network, the function selection and access control data indicative of the content owner's selection of the function modules to include on the website and the content owner's specification of the permitted users for each function module.

4. The configurable website system of claim 1 wherein at least one of said plurality of function modules is viewable by the public without any authentication.

5. The configurable website system of claim 1 wherein the access hardware includes a touch screen.

6. The configurable website system of claim 5 wherein the access hardware is a mobile telephone.

7. The configurable website system of claim 5 wherein the access hardware is a tablet computer.

8. The configurable website system of claim 1 wherein each function module is represented by a graphic on the website.

9. The configurable website system of claim 8 wherein a selected function module is displayed in a viewing window while other permitted function modules on the website are represented by a scroll of permitted function modules' associated graphics.

10. The configurable website system of claim 1 wherein at least one of said plurality of function modules includes a website data set.

11. The configurable website system of claim 10 wherein the at least one website data set includes a secondary authentication to a computing resource.

12. The configurable website system of claim 11 wherein the computing resource is a web server.

13. The configurable website system of claim 12 wherein the computing resource is a social media site.

14. The configurable website system of claim 1 wherein at least one of said plurality of function modules includes an application programming interface.

15. The configurable website system of claim 14 wherein the application programming interface is used to retrieve and display data.

16. The configurable website system of claim 14 wherein the application programming interface is used to change data.

17. The configurable website system of claim 14 wherein the application programming interface is used to supplement data.

18. The configurable website system of claim 1 wherein at least one of said plurality of function modules is generated by a third party.

19. The configurable website system of claim 1 wherein at least one of said plurality of function modules provides access on the website to third-party data.

20. The configurable website system of claim 1 wherein at least one of said plurality of function modules comprises an image.

21. The configurable website system of claim 1 wherein at least one of said plurality of function modules comprises a blog posting.

22. The configurable website system of claim 1 wherein said permitted user list provides various levels of access to each of the plurality of function modules.

23. The configurable website system of claim 22 wherein said permitted user list provides view only level access to at least one of said plurality of function modules, allowing an authenticated user only to view data displayed on the website by the function module.

24. The configurable web site system of claim 23 wherein said permitted user list provides editor level access to at least one of said plurality of function modules allowing an authenticated user to control the function module.

25. The configurable website system of claim 24 wherein editor level access to a function module permits an authenticated user to alter content that is displayed on the website by the function module to an authenticated user with view only level access to the function module.

26. The configurable website system of claim 22 wherein said permitted user list provides owner level access to at least one of said plurality of function modules allowing an authenticated user private access to view data displayed on the website by the function module.

27. The configurable website system of claim 1 wherein the permitted user list identifies at least one permitted group and wherein the user authentication identifies the user as a member of the at least one permitted group.

28. The configurable website system of claim 1 wherein one of the plurality of function modules comprises an electronic messaging module, said electronic messaging module comprising:

message data accessible by said web server, said message data comprising a list of at least one secondary electronic mailbox and messaging routing rules;

software executing on said web server for receiving a message through the website over the network;

software executing on said web server for determining, based at least in part upon the message data and the authentication, to which of one or more of the at least one secondary electronic mailbox to route the message; and software executing on said web server for routing the message to the determined one or more of the at least one secondary electronic mailbox over the network.

29. A configurable website system comprising:
- a web server available over a network, said web server having a server processor;
- a plurality of website data sets including information associated with a content owner in communication with said web server, said plurality of website data sets including a plurality of third party social media data feeds associated with a plurality of third party social media accounts of the content owner;
- a permitted user list associated with each of said plurality of website data sets, stored in a database in communication with said web server, said permitted user list identifying a plurality of users permitted by the content owner to access each of said website data sets, the content owner being an individual person who delegates and stores permissions for each of the users in said permitted user list on a user-by-user basis independent of any site level access control of the plurality of third party social media accounts; and
- software executing on said server processor for receiving a user authentication from viewing hardware over the network and using the authentication to retrieve at least two permitted ones of said plurality of website data sets including information associated with the content owner and at least two of the plurality of social media data feeds associated with at least two of the plurality of social media accounts of the content owner to which the user authentication is permitted access,
- wherein said server software, using at least one of the two permitted website data sets, performs a secondary authentication to an Internet computing resource to allow for the display of content from the resource on the viewing hardware,
- whereby content available elsewhere on the Internet, including the at least two permitted ones of said plurality of website data sets, is selectively displayed by said web server on a user-by-user basis.

30. The configurable website system of claim 29 wherein both of the permitted website data sets include a secondary authentication to an Internet computing resource.

31. The configurable website system of claim 29 wherein the displayed content is publically available elsewhere on the Internet.

32. The configurable website system of claim 31 wherein the displayed content is only available elsewhere on a members-only portion of the Internet.

33. The configurable website system of claim 29 wherein general public users are authenticated users.

34. The configurable website system of claim 29 wherein a subset of all general public users are authenticated users.

35. The configurable website system of claim 29 wherein the displayed content includes a photo.

36. The configurable website system of claim 29 wherein the displayed content includes an email message.

37. The configurable website system of claim 26 wherein the displayed content includes an email account.

38. The configurable website system of claim 29 wherein the displayed content includes an electronic business card.

39. The configurable website system of claim 38 wherein the electronic business card information depends on a user's authentication.

40. The configurable website system of claim 29 wherein the displayed content includes a data stream.

41. The configurable website system of claim 40 wherein the data stream includes a blog.

42. The configurable website system of claim 40 wherein the data stream includes at least one of an RSS feed and an atom feed.

43. The configurable website system of claim 42 wherein the data stream includes a plurality of social media streams.

44. The configurable website system of claim 29 wherein the displayed content includes a map.

45. The configurable website system of claim 29 wherein the displayed content includes a curriculum vitae.

46. The configurable website system of claim 29 wherein the displayed content includes a diary.

47. The configurable website system of claim 29 wherein the displayed content includes a biography.

48. The configurable website system of claim 29 wherein the displayed content includes a portfolio.

49. The configurable website system of claim 48 wherein the portfolio includes music.

50. The configurable website system of claim 48 wherein the portfolio includes art.

51. The configurable website system of claim 48 wherein the portfolio includes writing.

52. The configurable website system of claim 51 wherein the writing includes nonfiction.

53. The configurable website system of claim 51 wherein the writing includes fiction.

54. The configurable website system of claim 51 wherein the writing includes poetry.

55. The configurable website system of claim 48 wherein the portfolio includes securities data.

56. The configurable website system of claim 29 wherein the displayed content includes news.

57. The configurable website system of claim 29 wherein the displayed content includes a video.

58. The configurable website system of claim 29 wherein the displayed content includes owner positional related data.

59. The configurable website system of claim 29 wherein the permitted user list identifies at least one permitted group and wherein the user authentication identifies the user as a member of the at least one permitted group.

60. A configurable website system comprising:
- a web server available over a network, said web server having a server processor;
- a plurality of websites in data communication with said web server, said plurality of websites including a plurality of third party social media websites associated with a plurality of social media accounts of a content owner;
- a plurality of authentications stored in a database in communication with said web server permitting one or more users access, granted by the content owner, to at least a portion of one or more of said plurality of websites including the at least one of the plurality of third party social media websites associated with the plurality of social media accounts of the content owner, said plurality of websites including information associated with the content owner, the content owner being an individual person who delegates and stores the authentications for the one or more users on a user-by-user basis independent of any site level access control of the plurality of third party social media accounts; and
- software executing on the server processor for receiving an authentication from access hardware over the network and presenting for display to a particular user on the access hardware a list of the websites at least a portion of which is permitted to be viewed by the particular user, including at least two of the plurality of third party social media websites associated with at least two of the plurality of third party social media accounts of the content owner, based on the received authentication.

61. The configurable website system of claim 60 further comprising software executing on the server processor for receiving function selection and access control data from setup hardware over the network, the function selection and access control data indicative of a selection of a list of function modules to include on a website and a list of authentications with permitted access to each function module.

62. The configurable website system of claim 61 further comprising software executing on the server processor for assembling websites from function modules on a user-by-user basis upon receipt of an authentication from the access hardware.

63. The configurable website system of claim 61 wherein access to said web server permitting selection of the function modules and setting of authentications for access to each function module requires the setup hardware to have website owner level authentication.

64. The configurable website system of claim 60 wherein said plurality of websites each include a plurality of function modules, and wherein permitted access to each of said plurality of function modules can be controlled by said authentication.

65. The configurable website system of claim 64 wherein the function module authentications permit viewing data in the authenticated function module on the website.

66. The configurable website system of claim 64 wherein the function module authentications permit supplementing data in the authenticated function module on the website.

67. The configurable website system of claim 64 wherein the function module authentications are arranged in groups of permitted users.

68. The configurable website system of claim 64 wherein at least one of said plurality of function modules is submitted by a third party.

69. The configurable web site system of claim 68 further comprising an application programming interface for use by the third party to program the at least one function module.

70. The configurable website system of claim 68 wherein the at least one function module is offered for sale by said web server.

71. The configurable website system of claim 68 wherein the at least one function module permits viewing of data on the website and wherein the viewed data is available elsewhere on the Internet through the third-party.

72. The configurable website system of claim 64 wherein at least one of the plurality of function modules includes at least one set of website data.

73. The configurable website system of claim 72 wherein the at least one set of website data includes a secondary authentication to a computing resource.

74. The configurable website system of claim 73 wherein the computing resource is a web server.

75. The configurable website system of claim 74 wherein the computing resource is a social media site.

* * * * *